Figure 1:
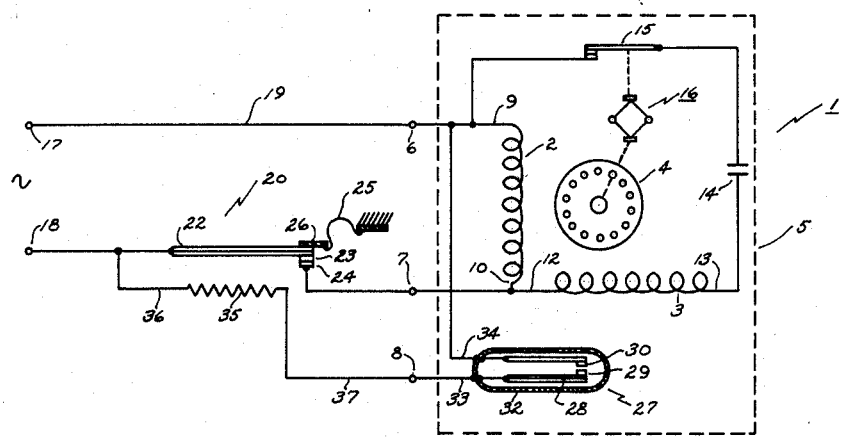

March 29, 1960   C. W. SLOCUM   2,930,959

MOTOR OVERLOAD PROTECTION SYSTEM

Filed Sept. 26, 1958

INVENTOR.
Charles W. Slocum
BY
Attorneys

United States Patent Office 2,930,959
Patented Mar. 29, 1960

2,930,959

MOTOR OVERLOAD PROTECTION SYSTEM

Charles W. Slocum, Angola, Ind., assignor to Stubnitz Greene Corporation, Adrian, Mich., a corporation of Michigan Application September 26, 1958, Serial No. 763,617

3 Claims. (Cl. 318—221)

This invention relates generally to motor overload protection systems, and more particularly to a system providing protection against excessive winding temperature.

Electric motors are subject to two types of overload conditions, both of which, unless speedily eliminated can cause damage to the motor. The first such overload condition is caused by excessive winding current, due for example to a locked rotor condition, i.e., a situation where the rotor or armature is prevented from rotating, an excessive mechanical driven load, or a low resistance or short circuit connection from the motor winding to ground. The second overload condition is due to excessive winding temperature, frequently but not necessarily associated with excessive winding current. Excessive winding temperature may be caused by operation of the motor in an unduly high ambient temperature in which case an excessive winding current condition would not necessarily be present. More commonly, however, a motor may operate for an extended period at a current of an excessive value so that the motor winding gradually reaches a temperature which will result in actually burning out of the winding or a marked decrease in the life of the winding.

Numerous overload devices and circuits have been provided designed to protect motors against over-current conditions, such devices and circuits generally disconnecting the motor winding from the source of power in response to such excessive current. Such devices and circuits, however, do not in and of themselves protect the motor against excessive winding temperatures, per se, since, as indicated above, a motor may operate for an extended period with a winding current just below that which will actuate the over-current protection device, with the result that after a period of time, the temperature rises to a value sufficient deleteriously to affect the insulation. Some overload protection devices and circuits known to the present applicant have attempted in some measure to protect against excessive internal temperature in the motor by situating a thermally actuated overload device on the motor shell. However, such arrangements are slow responding since they do not intimately and immediately sense the winding temperature and thus, an excessive winding temperature condition may arise which would result in burning out of the winding before the condition is sensed and the motor disconnected from the line. Still other arrangements have been proposed for actually sensing the internal temperature of the motor winding, however, to the best of the present applicant's knowledge, such arrangements have been entirely too complex and thus too expensive for general use with motors in the smaller frame sizes.

It is therefore desirable to provide a simple overload protection system for electric motors for providing protection against excessive winding temperature, such a system having fast response to both over-current and over-temperature conditions and utilizing a minimum of inexpensive components.

It is accordingly an object of my invention to provide an improved electric motor overload protection system.

Another object of my invention is to provide a new electric motor overload protection system providing fast response protection against excessive winding temperature.

A further object of my invention is to provide a new electric motor overload protection system providing fast response protection against both excessive current and excessive winding temperature.

Further objects and advantages of my invention will become apparent by reference to the following description and the accompanying drawing, and the features of novelty which characterize this invention will be pointed out with particularity in the claims annexed to and forming a part of this specification.

My invention, therefore, in its broader aspects, provides an electric motor having a winding and a switch assembly comprising a first pair of separable contacts and a first thermally responsive member for actuating the first pair of contacts, the switch assembly being disposed in an enclosure with a first pair of electrical leads respectively connected to the first pair of contacts and extending out of the enclosure. The enclosure is positioned in close heat-transfer relationship with the winding so that the first thermally responsive member senses the temperature of the winding and closes the first pair of contacts responsive to a predetermined winding temperature. A second pair of electrical leads are connected respectively to the ends of the winding for energizing the same and a second pair of separable contacts and a second thermally responsive member for actuating the second pair of contacts is provided, the second thermally responsive member being arranged so that the second pair of contacts is closed when the second thermally responsive member is below a predetermined temperature and open when the same is heated to a temperature above the predetermined temperature. The second pair of contacts are serially connected with one of the winding leads thereby to deenergize the winding when opened responsive to actuation by the second thermally responsive member. A heater element is provided disposed to heat the second thermally responsive member, the heater element being serially connected with the switch assembly leads across the winding leads so that closing of the first pair of contacts responsive to excessive winding temperature energizes the heater element thereby to heat the second thermally responsive member and open the second pair of contacts to deenergize the winding. It is thus seen that the winding is quickly deenergized responsive to excessive winding temperature.

Figure 2:
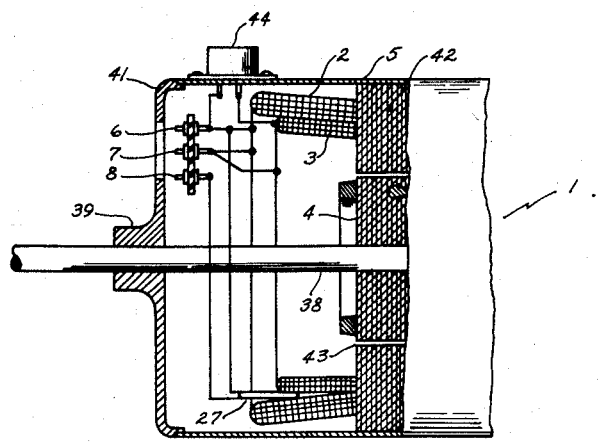

In the drawing:

Fig. 1 is a schematic illustration showing my invention applied to a single phase, capacitor start, alternating current induction motor; and Fig. 2 is a fragmentary side-elevational view, partly in cross-section, illustrating a single phase alternating current motor including the winding temperature sensing means of my invention.

Referring now to Fig. 1, there is shown a single phase alternating current induction motor, generally identified as 1 having conventional main and starting windings 2 and 3 and a conventional rotor 4, shown here as being of the well known squirrel cage type. Main and starting windings 2 and 3 are disposed on a suitable stator core member, as is well known in the art, and along with rotor member 4 are disposed within a suitable enclosing casing, indicated by dashed lines at 5. The motor 1 is provided with three external terminals 6, 7 and 8 with ends 9 and 10 of main winding 2 being respectively connected to the external terminals 6 and 7.

In the illustrated embodiment, end 12 of starting winding 3 is connected to end 10 of main winding 2 and thus external terminal 7 is the common terminal. The other end 13 of starting winding 3 is serially connected with a conventional starting capacitor 14 and contacts 15 of a conventional starting switch to the other end 9 of the main winding 2. Starting switch 15 is here shown as being actuated by a conventional centrifugal mechanism 16 responsive to a predetermined motor speed, as is well known in the art. It is here to be understood that neither the particular connection of the starting winding 3 nor the particular means of disconnecting the same from the main winding 2 at a predetermined speed form a part of my invention, and the specific starting capacitor 14, starting switch 15, and centrifugal mechanism 16 are therefore here shown for illustrative purposes only.

A pair of line terminals 17 and 18 are provided adapted to be respectively connected to a suitable external source of single phase alternating current (not shown) such as 60 cycles 115 volts, with line terminal 17 being directly connected to external motor terminal 6 by lead 19. Current responsive overload switch assembly 20 is serially connected between line terminal 18 and external motor terminal 7 and comprises a bimetallic member 22 and a pair of separable contacts 23 and 24, contact 23 being mounted on bimetallic member 22 with contact 24 being directly connected to external motor terminal 7 and bimetallic member 22 being directly connected to line terminal 18.

It will now be readily seen that the current drawn by main winding 2 and starting winding 3 when starting switch 15 is closed, or by main winding 2 alone when starting switch 15 is open, traverses bimetallic member 22 thus heating the same. Bimetallic member 22 of overload switch assembly 20 is arranged so that the contacts 23 and 24 are normally closed when the temperature of bimetallic member 22 is below a predetermined amount, i.e., with winding current flowing therethrough below a predetermined amount. However, when the winding current traversing bimetallic member 22 rises above such predetermined amount, i.e., bimetallic member 22 deflects thereby to open contacts 23 and 24 and to thus disconnect main winding 2 and starting winding 3 from the line. It will commonly be desirable to provide bimetallic member 22 with a differential action so that the temperature at which contacts 23 and 24 are opened is higher than the temperature at which the contacts will be reclosed. While bimetallic member 22 may take any form well known in the art and thus numerous means of providing the differential action are available to those skilled in the art, I have here shown for illustrative purposes a toggle spring 25 engaging the free end 26 of bimetallic member 22 in order to provide the requisite differential action.

In order to provide extremely fast sensing of excessive winding temperature, I have provided a hermetically sealed internal switch assembly 27 having an elongated bimetal member 28 with a contact 29 mounted at the free end thereof cooperating with a stationary contact 30, the contacts 29 and 30 being normally open and being closed responsive to distortion or deflection of the bimetallic member 28. Bimetallic member 28 and the contacts 29 and 30 are enclosed within a hermetically sealed thin-wall envelope 32 with leads 33 and 34 respectively connected to bimetallic member 28 and stationary contact 30 extending therefrom. The hermetic switch assembly 27 is disposed in close heat-transfer relationship with the main and starting windings 2 and 3 with its lead 33 connected to the third external motor terminal 8 and its lead 34 connected to the external motor terminal 6.

The bimetallic member 22 of the overload switch assembly 20 is provided with an auxiliary resistance heating element 35 disposed to heat the bimetallic member 22 and thereby to cause it to deflect or distort to open contacts 23 and 24. Resistance heating element 35 has one end 36 connected to line terminal 18 and its other end 37 connected to the external motor terminal 8. It will now be seen that resistance heating element 37 is serially connected with the internal winding temperature-sensing switch assembly 27 across the line, i.e., between the line terminal 18 and external motor terminal 6 which in turn is directly connected to the line terminal 17 by lead 19.

It will now be readily understood that excessive winding temperature of windings 2 and 3 will be immediately sensed by the bimetallic member 28 causing it to deflect thereby to close contacts 29 and 30 to energize resistance heating element 35 and thereby to heat bimetallic member 22 to open contacts 23 and 24 to disconnect main and starting windings 2 and 3 from the line. It will further be readily seen that in a situation in which the winding current is already at a high level, only slightly under that required sufficiently to heat bimetallic member 22 to open contacts 23 and 24, closing of contacts 29 and 30 of internal switch 27 responsive to excessive winding temperature sensed by the bimetallic member 28 resulting in energizing of heating element 35 will result in nearly instantaneous additional deflection of bimetallic member 22 sufficient to open contacts 23 and 24 thus to disconnect the motor from the line.

Referring now to Fig. 2 in which like elements are indicated by like reference numerals, there is shown a single phase alternating current motor 1 in which the squirrel cage rotor member 4 is mounted on shaft 38 journaled in a conventional bearing 39 in turn supported by end shield 41 secured to the enclosing case 5. Main and starting windings 2 and 3 are here shown positioned in stator core member 42 which defines a concentric air gap 43 with rotor member 4 in accordance with conventional practice. In order to provide the requisite fast response to excessive winding temperature, the internal winding temperature-sensing switch assembly 27 is preferably arranged in intimate contact with one of the windings 2 and 3, being shown here as being inserted between main winding 2 and starting winding 3. While a starting switch and centrifugal mechanism is shown in Fig. 1 for disconnecting starting winding 3 from main winding 2, I have shown in Fig. 2 a conventional starting relay 44 mounted on the exterior of frame 5, it being again readily understood that other conventional single phase alternating current motor starting arrangements well known in the art may be employed.

My improved overload arrangement is particularly advantageous since it will be observed that the overload switch assembly 20 may be remotely located with respect to the motor 1 and with only three leads being required between the overload switch assembly and the motor. It will be readily seen that the imbedding of the internal hermetically sealed switch assembly 27 directly in the windings of the motor provides immediate and extremely rapid sensing of over-temperature conditions whereas the external switch assembly 20 likewise provides immediate sensing of over-current conditions, the two sensing means cooperating to provide extremely fast overload protection against both excessive current and excessive winding temperature. It will be readily understood that my invention is not necessarily limited to single phase alternating current induction motors of the type shown in Fig. 1, i.e., split-phase or capacitor start motors, and my invention is equally applicable to other forms of alternating current motors, such as shaded pole motors or to direct current motors since the same requirements for fast-acting protection against excessive current and excessive winding temperature conditions prevail in all types of motors. It will, however, be observed that my invention is particularly applicable to hermetically sealed motors of the type used for powering air conditioning and refrigeration compressors by virtue of the hermetically sealed internal winding-temperature sensing switch assembly 27.

While I have illustrated and described a specific embodiment of my invention, further modifications and improvements will occur to those skilled in the art, and I desire therefore in the appended claims to cover all modifications which do not depart from the spirit and scope of this invention.

What is claimed is:

1. In combination: an electric motor having an enclosing casing and a winding therein, said motor having at least three external terminals with said winding connected across two of said terminals; a first switch assembly comprising a first pair of separable contacts and a first bimetallic member with one of said contacts being mounted thereon, said first switch assembly being disposed in a hermetically sealed thin-wall envelope with a first pair of electrical leads respectively connected to said first bimetallic member and the other of said pair of contacts and extending out of said envelope, said envelope being positioned completely within said motor casing and in intimate contact with said winding so that said first bimetallic member senses the temperature of said winding and closes said first pair of contacts responsive to a predetermined winding temperature; a second switch assembly positioned exteriorly of and remote from said motor casing and comprising a second pair of separable contacts and a second bimetallic member having one of said second pair of contacts mounted thereon, said second bimetallic member being arranged so that said second pair of contacts is closed when said second bimetallic member is below a predetermined temperature and open when the same is heated to a temperature above said predetermined temperature, said second bimetallic member being provided with a differential whereby said second pair of contacts are closed thereby at a temperature lower than said last-named predetermined temperature; a pair of line terminals for connection to an external source of power, one of said line terminals being directly connected to one of said two external motor terminals, said second bimetallic member and said second pair of contacts being serially connected between the other of said line terminals and the other of said two external motor terminals so that current drawn by said winding passes through and heats said second bimetallic member whereby winding current above a predetermined value causes said second bimetallic member to open said second pair of contacts thereby to deenergize said winding; and a heater element disposed to heat said second bimetallic member; said first switch assembly leads being respectively connected to one of said two external motor terminals and the third of said external motor terminals, said heater element being serially connected between said third external motor terminal and the line terminal other than the one to which said last-named one of said two external motor terminals is connected so that closing of said first pair of contacts responsive to excessive winding temperature energizes said heater element thereby to heat said second bimetallic member and to open said second pair of contacts to deenergize said winding whereby said winding is deenergized responsive to either excessive winding current or temperature.

2. In combination: a single phase alternating current motor having an enclosing casing and a main winding and a starting winding; a first switch assembly comprising a first pair of separable contacts and a first bimetallic member for actuating said first pair of contacts, said first switch assembly being disposed in a hermetically sealed thin wall envelope with a first pair of electrical leads respectively connected to said first pair of contacts and extending out of said envelope, said envelope being positioned completely within said casing and in intimate contact with at least one of said windings so that said first bimetallic member senses the temperature of said windings and closes said first pair of contacts responsive to a predetermined temperature of said windings; said starting winding being electrically connected across said main winding; a second pair of electrical leads connected respectively to the ends of said main winding for energizing both of said windings; a second switch assembly comprising a second pair of separable contacts and a second bimetallic member having one of said second pair of contacts mounted thereon, said second bimetallic member being arranged so that said second pair of contacts is closed when said second bimetallic member is below a predetermined temperature and open when the same is heated to a temperature above said predetermined temperature, said second bimetallic member and said second pair of contacts being serially connected with one of said second pair of electrical leads so that current drawn by said windings passes through and heats said second bimetallic member whereby winding current above a predetermined value causes said second bimetallic member to open said second pair of contacts thereby to deenergize said windings; a heater element disposed to heat said second bimetallic member and serially connected with said first pair of electrical leads across said second pair of electrical leads so that closing of said first pair of contacts responsive to excessive temperature of said windings energizes said heater element thereby to heat said second bimetallic member and to open said second pair of contacts to deenergize said windings whereby said windings are deenergized responsive to either excessive winding current or temperature; and means for disconnecting said starting winding from said main winding responsive to a predetermined motor speed.

3. In combination: a single phase alternating current motor having an enclosing casing and a main winding and a starting winding; a first switch assembly comprising a first pair of separable contacts and a first bimetallic member for actuating said first pair of contacts, said first switch assembly being disposed in a hermetically sealed thin-wall envelope with a first pair of electrical leads respectively connected to said first pair of contacts and extending out of said envelope, said envelope being positioned completely within said casing and between said main and starting windings and in intimate contact therewith so that said first bimetallic member senses the temperature of said windings and closes said first pair of contacts responsive to a predetermined temperature of said windings; said starting winding being electrically connected across said main winding; a second pair of electrical leads connected respectively to the ends of said main winding for energizing both of said windings; a second switch assembly disposed exteriorly of said motor and comprising a second pair of separable contacts and a second bimetallic member having one of said second pair of contacts mounted thereon, said second bimetallic member being arranged so that said second pair of contacts is closed when said second bimetallic member is below a predetermined temperature and open when the same is heated to a temperature above said predetermined temperature, said second bimetallic member and said second pair of contacts being serially connected with one of said second pair of electrical leads so that current drawn by said windings passes through and heats said second bimetallic member whereby winding current above a predetermined value causes said second bimetallic member to open said second pair of contacts thereby to deenergize said windings; a heater element disposed to heat said second bimetallic member and serially connected with said first pair of electrical leads across said second pair of electrical leads so that closing of said first pair of contacts responsive to excessive temperature of said windings energizes said heater element thereby to heat said second bimetallic member and to open said second pair of contacts to deenergize said windings whereby said windings are deenergized responsive to either excessive winding current or temperature; and a third switch assembly independent of said first and second switch assemblies and spaced therefrom, said third switch assembly comprising a third pair of separable contacts serially connected with said starting winding and means for actuating said third pair of contacts thereby to disconnect said starting winding from said main winding responsive to a predetermined motor speed.

References Cited in the file of this patent
UNITED STATES PATENTS

| | | |
|---|---|---|
| 2,063,981 | Brunner | Dec. 15, 1936 |
| 2,463,935 | Fish et al. | Mar. 8, 1949 |